(12) United States Patent
Yasunaga et al.

(10) Patent No.: US 9,386,168 B2
(45) Date of Patent: Jul. 5, 2016

(54) PRINTED MEDIA REUSE DETERMINATION APPARATUS AND MEDIA REUSE DETERMINATION PROGRAM

(71) Applicant: Toshiba Tec Kabushiki Kaisha, Tokyo (JP)

(72) Inventors: Masaaki Yasunaga, Shizuoka (JP); Akihiko Fujiwara, Kanagawa (JP); Shunichi Megawa, Shizuoka (JP); Hajime Tomizawa, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 88 days.

(21) Appl. No.: 13/871,388

(22) Filed: Apr. 26, 2013

(65) Prior Publication Data

US 2013/0293931 A1 Nov. 7, 2013

(30) Foreign Application Priority Data

May 1, 2012 (JP) .................................. 2012-104639

(51) Int. Cl.
| | |
|---|---|
| *G06K 15/00* | (2006.01) |
| *G06F 3/12* | (2006.01) |
| *H04N 1/00* | (2006.01) |
| *B41J 11/00* | (2006.01) |
| *G03G 15/00* | (2006.01) |

(52) U.S. Cl.
CPC ........... *H04N 1/00037* (2013.01); *B41J 11/009* (2013.01); *G03G 15/5029* (2013.01); *G03G 2215/00751* (2013.01)

(58) Field of Classification Search
None
See application file for complete search history.

(56) References Cited

U.S. PATENT DOCUMENTS

| | | | |
|---|---|---|---|
| 2005/0141906 A1* | 6/2005 | Murakami | ...................... 399/45 |
| 2009/0154970 A1* | 6/2009 | Yoshida et al. | ................ 399/341 |
| 2010/0118349 A1* | 5/2010 | Ozawa | ........................... 358/401 |
| 2010/0271410 A1* | 10/2010 | Kaneko et al. | ..................... 347/6 |
| 2011/0305851 A1* | 12/2011 | Wang et al. | ................ 428/32.31 |

FOREIGN PATENT DOCUMENTS

| | | | |
|---|---|---|---|
| JP | 2003281478 A | | 10/2003 |
| JP | 2007090551 | * | 4/2007 |
| JP | 2007090551 A | | 4/2007 |
| JP | 2010-165072 | | 7/2010 |

OTHER PUBLICATIONS

Machine translation of JP Pub 2007-090551 to Okuma Takashi.*
Machine translation of JP Pub 2003-281478 to Kagaya Naoto.*
Machine translation of JP Pub 2007090551 to Okuma Takashi.*
Japanese Office Action dated Apr. 1, 2014, filed in Japanese counterpart Application No. 2012-104639, 6 pages (with translation).

* cited by examiner

*Primary Examiner* — Benny Q Tieu
*Assistant Examiner* — Haris Sabah
(74) *Attorney, Agent, or Firm* — Patterson & Sheridan, LLP (57) ABSTRACT

According to one embodiment, the media reuse determination apparatus has a decoding section, a reusability determination section, and an output section. The decoding section decodes information related to management of a print media attached to the print media obtained by using a reading apparatus to read the object having the information recorded thereon, and it carries out error correction during decoding of the information. On the basis of the result of the error correction carried out during decoding of the information by the decoding section, the reusability determination section determines whether or not the print media can be reused. The output section outputs the result of the determination made by the reusability determination section.

11 Claims, 11 Drawing Sheets

MANAGEMENT DB 21a

| MEDIA ID | SHEET STATE | NUMBER OF ERASURES | ........ |
|---|---|---|---|
| A000001 | IN USE | 5 | ........ |
| A000002 | DISCARDED | 7 | ........ |
| A000003 | IN USE | 0 | ........ |
| A000004 | IN USE | 2 | ........ |
| A000005 | IN USE | 5 | ........ |
| A000006 | DISCARDED | 4 | ........ |
| A000007 | DISCARDED | 7 | ........ |
| | | | |
| | | | |

PRINTED MEDIA REUSE DETERMINATION APPARATUS AND MEDIA REUSE DETERMINATION PROGRAM

CROSS-REFERENCE TO RELATED APPLICATION

This application is based upon and claims the benefit of priority from Japanese Patent Application No. 2012-104639, filed May 1, 2012; the entire contents of which are incorporated herein by reference.

FIELD

Embodiments described herein relate to a printed media reuse determination apparatus and a media reuse determination program for determining whether or not a printed media can be reused.

BACKGROUND

In recent years, much attention has been paid on reusing various types of products in order to conserve energy. Paper sheets and other printing media are no exception. Efforts have been made to reuse them.

For example, for recycling of paper sheets after printing of images thereon by printers, etc., processing of maceration, dust removal, etc. is carried out to form a used paper pulp, which is blended with new pulp to create new paper sheets. However, such reuse method has a high cost, and is relatively high in energy cost.

On the other hand, there is also a technology whereby the ink, toner, or other image forming substance on the printed media is "erased" by being de-colored or cleaned off so that the image is erased, and the print media can be reused. However, it is believed that according to this method, the print media degrades in the de-coloring or cleaning step.

DETAILED DESCRIPTION

Embodiments provide a print media reuse determination apparatus and a print media reuse determination program that can prevent reuse of degraded erased print media.

In general, according to one embodiment, the present embodiment will be explained with reference to the drawings. In the embodiments to be presented below, in a reuse system, by attaching an object that records the sheet identification information and other management information on each sheet of the print media, the reuse of the print media is managed.

The media reuse determination apparatus according to the present embodiment includes a decoding section, a reusability determination section, and an output section. The decoding section is attached on a printed media and has a function of carrying out trial decoding of the information related to management of the print media from data obtained by using a reading apparatus to read an object having the information, and carrying out an error correction when the information is decoded. The reusability determination section determines whether or not the print media can be reused on the basis of the result of the error correction carried out during decoding of the information by the decoding section. The output section outputs the result of determination made by the reusability determination section.

(First Embodiment)

In the first embodiment, as an example, a QR code (registered trademark) symbol that records the management information is attached as the object on each sheet.

Figure 1:
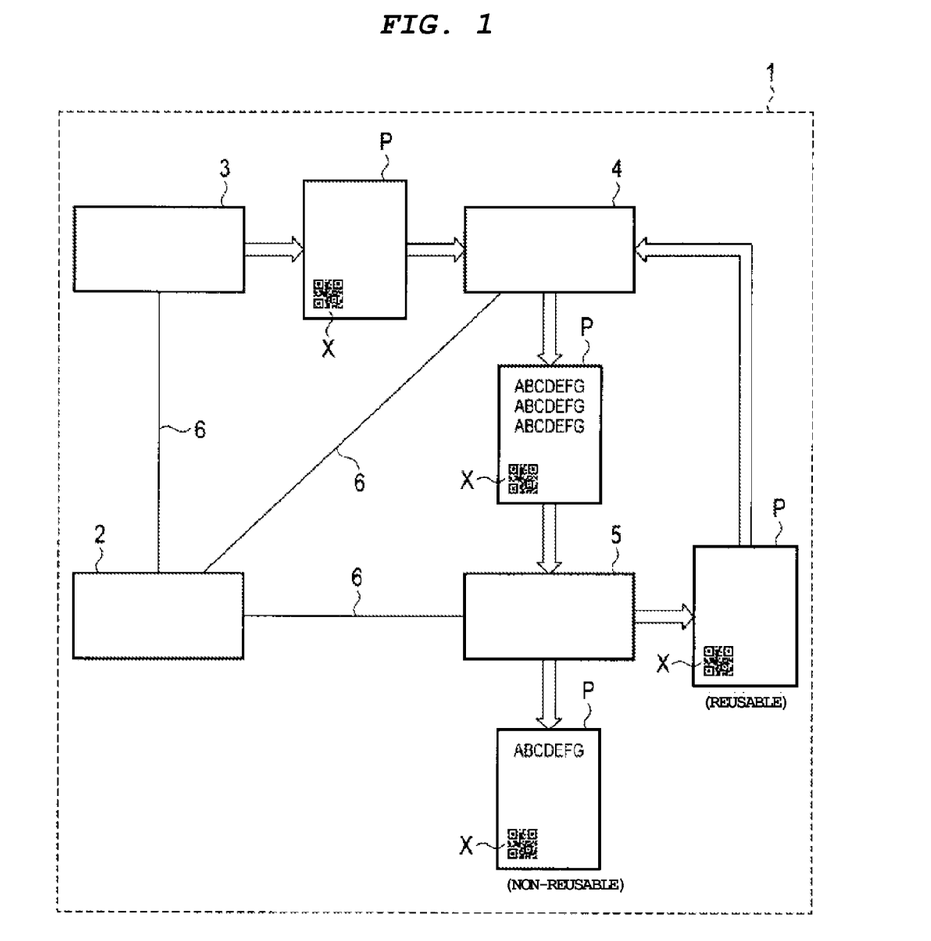
FIG. 1 is a block diagram illustrating the configuration of the reuse system according to a first embodiment.

FIG. 1 is a block diagram illustrating the configuration of the reuse system 1 according to the present embodiment. The reuse system 1 includes a server 2 that supervises the reuse system 1, a management information attaching apparatus 3 that attaches the management information on the sheet P, a printing apparatus 4 that forms any image on the sheet P, and an erasing and reuse-determination apparatus 5 that erases the image formed on the sheet P and determines whether the sheet P can be reused. The server 2, the management information attaching apparatus 3, the printing apparatus 4 and the erasing and reuse-determination apparatus 5 are connected to each other via an LAN (Local Area Network) line or other communication line 6 so that they can communicate with each other.

Figure 2:
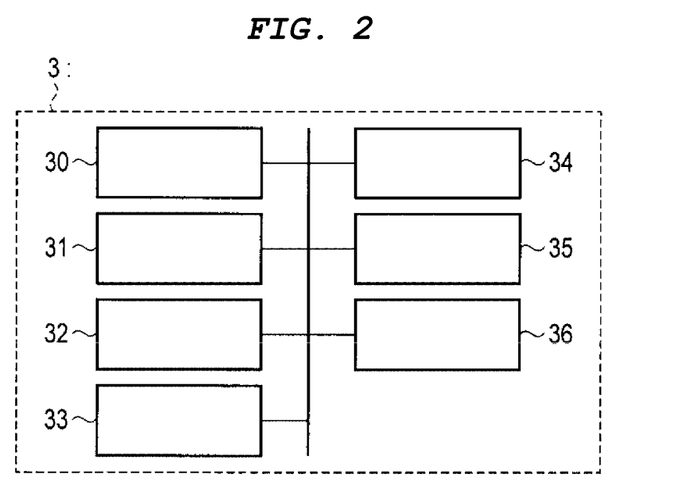
FIG. 2 is a block diagram illustrating the configuration of the main portion of the management information attaching apparatus according to the first embodiment.

FIG. 2 is a block diagram illustrating the configuration of the main portion of the management information attaching apparatus 3. For example, the management information attaching apparatus 3 includes a processor 30 that is a CPU (central processing unit), a memory 31 made of ROM (read-only memory), RAM (random access memory), etc., an user interface 32, a NIC (Network Interface Card) 33, a feeding mechanism 34, a printing mechanism 35, and a discharge mechanism 36.

The memory 31 stores the computer program group, etc. for execution by the processor 30. The user interface 32 includes, e.g., mechanical buttons, a pointing device, a keyboard, a touch panel, and other input devices, a display, lamps, speakers, and other output devices. The NIC 33 connects the management information attaching apparatus 3 to the communication line 6. Instead of the NIC 33, one may also arrange other types of communication interface in the management information attaching apparatus 3.

The feeding mechanism 34 includes a conveying roller for feeding the sheet P accommodated in a sheet cassette or the like arranged in the management information attaching apparatus 3 into the case of the management information attaching apparatus 3, a motor for driving the conveying roller, etc.

The printing mechanism 35 prints a QR code symbol X (see FIG. 1) indicating the management information using a normal toner that cannot be erased by de-coloring, cleaning, heating or the like, with respect to the printing surface of the paper sheet P transported by the feeding mechanism 34. Here, the printing mechanism 35 may also print the QR code symbol X using an ink or other image forming material that cannot be erased by de-coloring, cleaning, heating or the like in place of the toner.

The discharge mechanism 36 includes a conveying roller and a motor for driving the conveying roller for discharging the sheet P after printing of the QR code symbol X by the printing mechanism 35 to the discharged sheet tray, etc.

The printing apparatus 4 uses a toner that can be erased by de-coloring, cleaning, heating or the like to print an image on the print surface of the sheet P. However, the printing mechanism 35 may also print the QR code symbol X by using an ink or other image forming material that cannot be erased by de-coloring, cleaning, heating or the like in place of the toner. The print data are sent to the printing apparatus 4 via the server 2 from a personal computer or other client terminal connected for communication with the server 2. Also, the print data may be of the type for reading by a scanner arranged in the printing apparatus 4 from another sheet or the like.

Examples of the image forming materials for use in the printing apparatus 4 include heating-de-coloring toners containing coloring compounds, developing agents, binder resin, etc. as the ingredients. In such toner, the coloring compound appears colored (including black, and white) by action of the developing agent, so that it is visible to the human eye. Then, if the toner in colored state is heated to more than the erasure temperature, the binder resin in the toner is softened, and the developing agent can easily migrate from the interior of the binder resin to the surface, and, at the same time, it can easily move and diffuse into the sheet P used as the printing media. Consequently, the coloring compound is de-colored, and the color or image of the toner on the sheet cannot be readily seen by the human eye.

Figure 3:
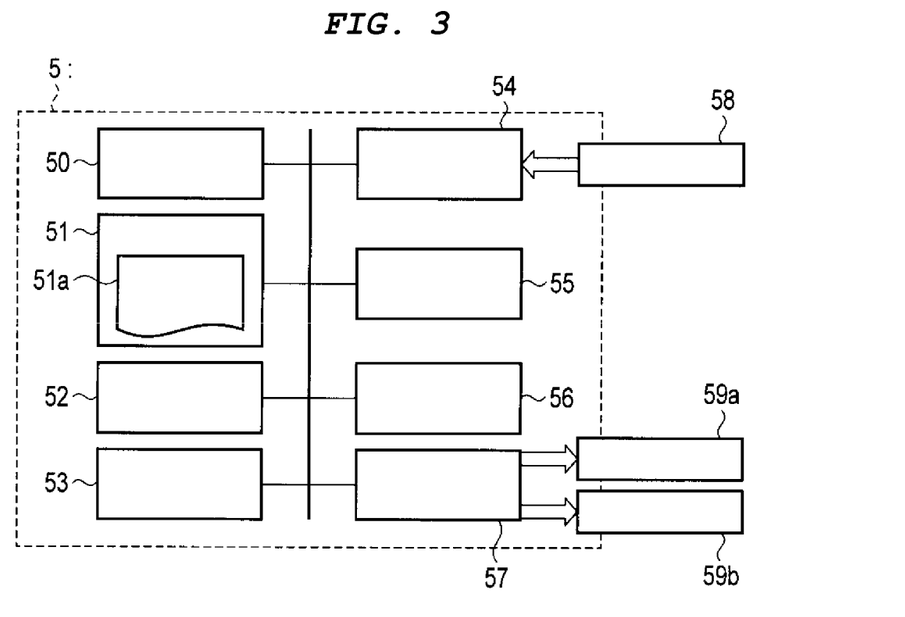
FIG. 3 is a block diagram illustrating the configuration of the main portion of the erasing and reuse-determination apparatus according to the first embodiment.

FIG. 3 is a block diagram illustrating the configuration of the main portion of the erasing and reuse-determination apparatus 5. Here, the erasing and reuse-determination apparatus 5 includes a processor 50, e.g., a CPU, a memory 51 including ROM, RAM, etc., a user interface 52, an NIC 53, a feeding mechanism 54, an erasure mechanism 55, a scanner 56, and a discharge mechanism 57. The scanner 56 works as a reading apparatus in this embodiment.

The memory 51 has the following stored therein: a computer program group for execution by the processor 50, and a threshold file 51a in which the threshold adopted for determining whether or not the sheet P can be reused has been written.

The user interface 52 includes, e.g., mechanical buttons, a pointing device, a keyboard, a touch panel, and other input devices, a display, lamps, speakers, and other output devices. The NIC 53 connects the erasing and reuse-determination apparatus 5 to the communication line 6. Instead of the NIC 53, one may also arrange other types of communication interface in the erasing and reuse-determination apparatus 5.

The feeding mechanism 54 includes a conveying roller for feeding the sheet P accommodated in a sheet stacker 58 arranged on the surface of the case of the erasing and reuse-determination apparatus 5 to the image erasing position by the erasure mechanism 55, a motor for driving the conveying roller, etc.

The erasure mechanism 55 erases the image printed with the printing apparatus 4 from the print surface of the sheet P conveyed by the feeding mechanism 54 to the image erasure position. For example, when heat-de-coloring toner is adopted as the image forming material used in the printing apparatus 4, the printing mechanism 35 includes a heater that heats the print surface of the sheet P conveyed to the image erasing position, so that the heat de-coloring toner attached on the print surface is de-colored or erased.

The scanner 56 performs optical scanning of the print surface of the sheet P after erasure of the image with the erasure mechanism 55 to generate the image data related to the print surface.

The discharge mechanism 57 includes a conveying roller for selectively discharging the sheet P, after reading of its print surface with the scanner 56, to one of plural different positions, and a motor for driving the conveying roller. According to the present embodiment, the plural different positions refer to a first discharged paper stacker 59a and a second discharged paper stacker 59b arranged on the case surface of the erasing and reuse-determination apparatus 5.

Figure 4:
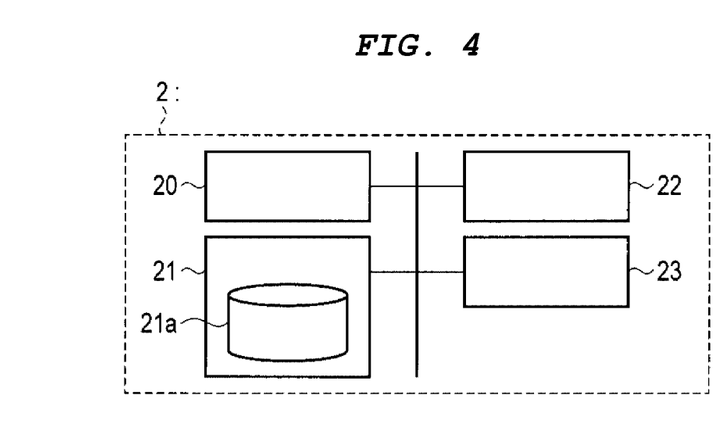
FIG. 4 is a block diagram illustrating the configuration of the main portion of the server according to the first embodiment.

FIG. 4 is a block diagram illustrating the configuration of the main portion of the server 2. Here, the server 2 includes a processor 20 which is a CPU, a memory 21 including ROM, RAM, etc., a user interface 22, and an NIC 23.

Figure 5:
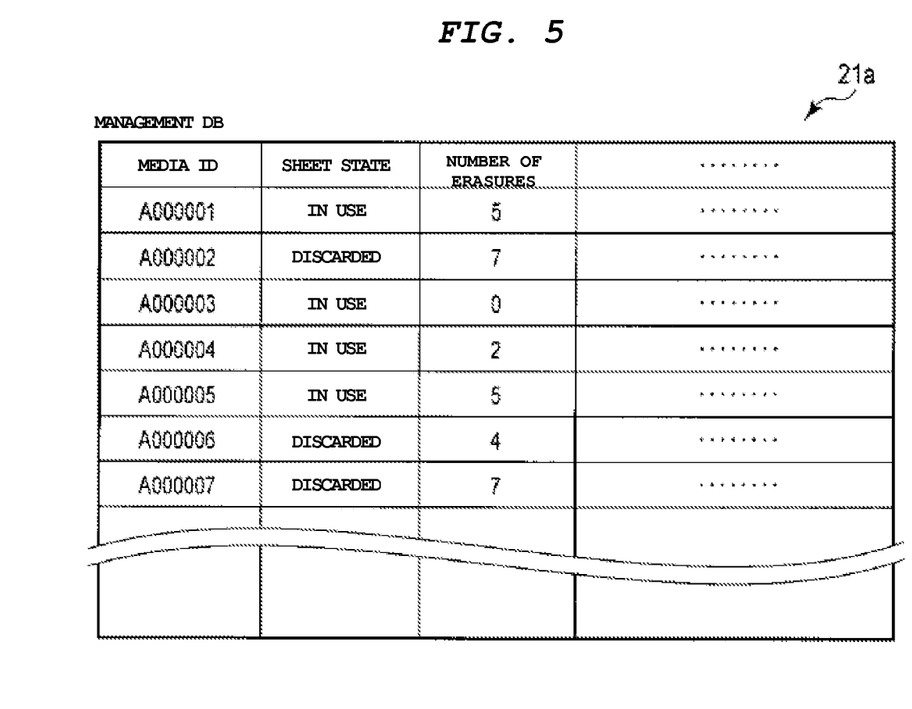
FIG. 5 is a diagram illustrating an example of the data configuration of the management DB according to the first embodiment.

The memory 21 stores the computer program group for execution by the processor 20, and a management DB (Data Base) 21a having the information for managing the sheet P, etc. FIG. 5 is a diagram illustrating an example of the configuration of the data of the management DB 21a, etc. The management DB 21a includes the records arranged for each of the media ID for identifying the individual sheet P. Each record includes the media ID, the state ("in use" or "discarded") of the sheet P identified by the media ID, and the number of erasures of the images (hereinafter to be referred to as number of erasures) by the erasing and reuse-determination apparatus 5 for the sheet P identified by the media ID. In addition, each record may also contain the information (name, etc.) related to the user of the sheet P identified by the media ID, the total print area (with units of, e.g., M pixels) of image printed with the printing apparatus 4 on the print surface of the sheet P identified by the media ID, etc.

The user interface 22 includes, e.g., the mechanical buttons, a pointing device, a keyboard, a touch panel, and other input devices, a display, lamps, speakers, and other output devices. The NIC 23 has the server 2 connected to the communication line 6. Instead of the NIC 23, other types of communication interfaces may also be arranged in the server 2.

The computer program group stored in the memory 51 of the erasing and reuse-determination apparatus 5 includes the media reuse determination program for determining whether the sheet P can be reused. As shown in the functional block diagram of FIG. 6, the media reuse determination program enables the processor 50 to work as a decoding section 100, a number of erasures specifying section 101, a contamination/ damage state specifying section 102, a reusability determination section 103, an output section 104, and a discharging control section 105.

Figure 6:
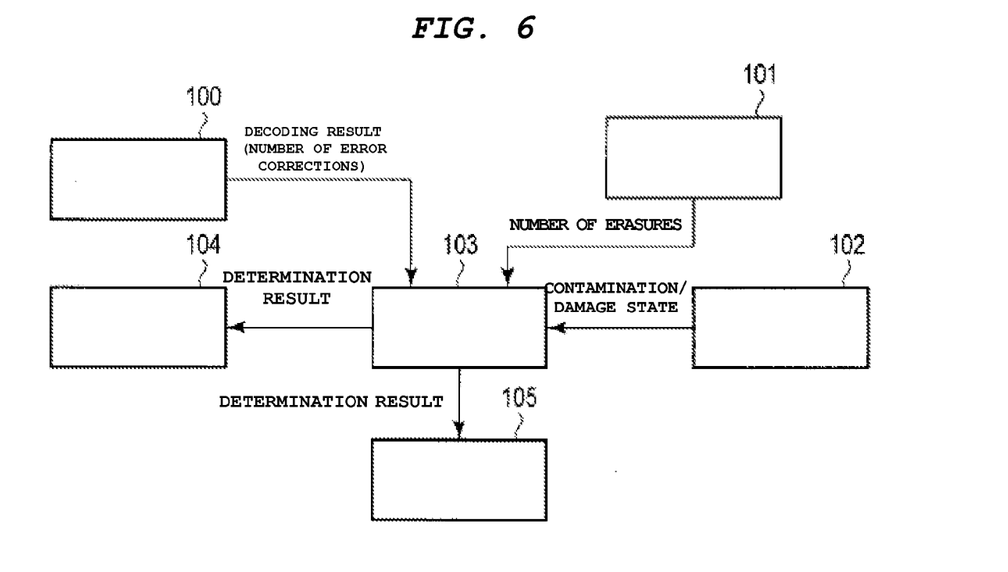
FIG. 6 is a block diagram illustrating the function realized by the media reuse determination program according to the first embodiment.

The decoding section 100 carries out decoding of the management information from the image data obtained by reading the QR code symbol X attached on the sheet P with the scanner 56. In addition, the decoding section 100 has a function of carrying out an error correction when decoding of the management information is carried out. Where the QR code has been subject to encoding using Reed-Solomon codes and it includes the redundancy symbol for error correction. The decoding section 100 carries out the error correction using the well-known scheme adopting this redundancy symbol.

With the management DB 21a taken as a reference, the number of erasures specifying section 101 specifies the number of erasures of the sheet P identified by the media ID included in the management information decoded with the decoding section 100.

The contamination/damage state specifying section 102 specifies the contamination/damage state of the print surface on the basis of the image data obtained by the scanner 56 that reads the print surface of the sheet P after erasure of the image.

The reusability determination section 103 determines whether the sheet P can be reused on the basis of the result of the error correction carried out with the decoding section 100, the number of erasures specified by the erasure number specifying section 101, and the contamination/damage state specified with the contamination/damage state specifying section 102.

The output section 104 outputs the determination result obtained with the reusability determination section 103.

The discharging control section 105 changes the location where the sheet is stored to a different position where the sheet P is discharged by the discharge mechanism 57 when the reusability determination section 103 determines that the sheet can be reused versus when it determines that the sheet cannot be reused, respectively.

In the following, the specific operations of the server 2, the management information attaching apparatus 3 and the erasing and reuse-determination apparatus 5 will be explained.

In order to add a new sheet P to the subject of management of the reuse system 1, it is necessary to first attach the management information on the sheet P with the management information attaching apparatus 3. When the management information is attached, the user sets a new sheet P in the sheet cassette of the management information attaching apparatus 3, and operates the input device included in the user interface 32 to instruct execution of the management information attaching process.

Figure 7:
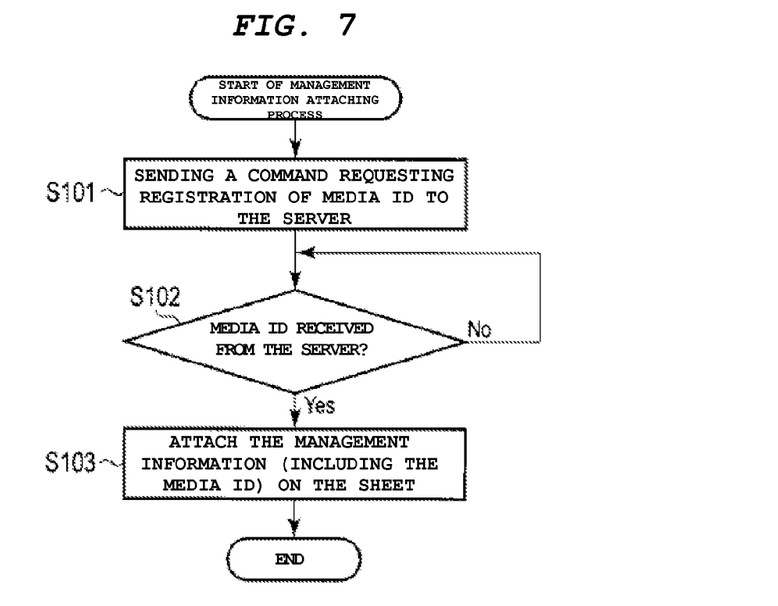
FIG. 7 is a flow chart illustrating the management information attaching process according to the first embodiment.

In this case, the processor 30 of the management information attaching apparatus 3 works according to the flow chart shown in FIG. 7. That is, first of all, the processor sends a registration request command that requests registration of the media ID via the NIC 33 to the server 2 (step S101), and it then stands by for receiving the media ID to be sent as a reply from the server 2 (step S102). Upon receiving the registration request command, the server 2 replies and sends the media ID to the management information attaching apparatus 3 in an operation to be explained later with reference to FIG. 8.

Upon receiving the media ID sent as a reply from the server 2 by the NIC 33 (Yes in step S102); the processor 30 attaches the management information including the media ID and the current date/hour, etc. onto the sheet P (step S103). More specifically, the processor 30 converts the management information to the Reed-Solomon code, generates the redundancy symbol as above, generates the image data of the QR code symbol X that represents the management information and the redundancy symbol, and stores the code symbol in the memory 31. In addition, the processor 30 controls the feeding mechanism 34 so that the sheet P in the sheet cassette is fed to the printing position; it controls the printing mechanism 35 so that the QR code symbol X is printed on the print surface of the sheet P on the basis of the image data stored in the memory 31; and it controls the discharge mechanism 36 to discharge the sheet P after the printing operation to the discharged sheet tray.

Then, after step S103, the management information attaching process comes to an end.

During the period when the reuse system 1 operates, the server 2 executes the media registration process alongside other processes. In the media registration process, the processor 20 of the server 2 operates according to the flow chart shown in FIG. 8. That is, the processor 20 stands by for receiving the registration request command sent from the management information attaching apparatus 3 in step S101 (step S201).

Figure 8:
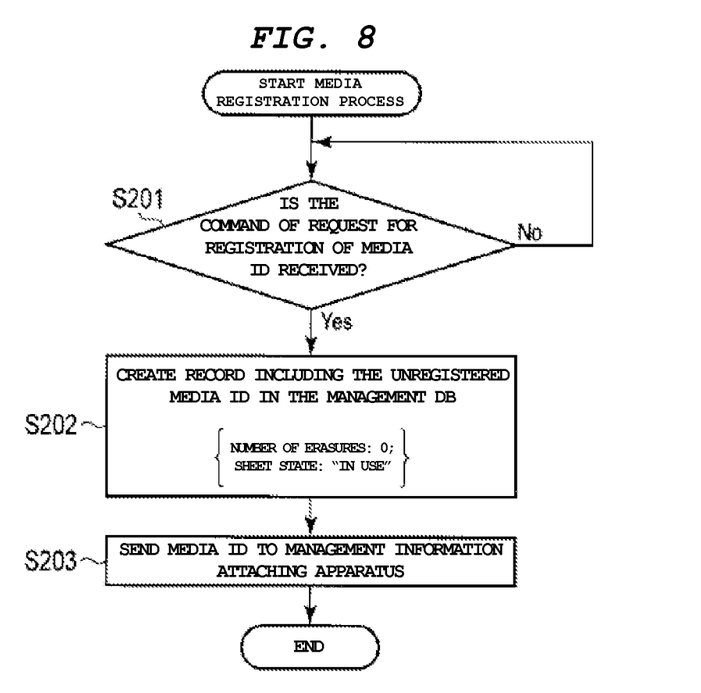
FIG. 8 is a flow chart illustrating the media registration process according to the first embodiment.

Upon receiving the registration request command via the NIC 23 (Yes in step S201), from among the media IDs that have not been used (not registered to a specific sheet) in the management DB 21a, the processor 20 selects one, and creates a record of the assignment of the ID, registering the selected media ID in the management DB 21a (step S202). In this case, the processor 20 sets a counter at "0" for the number of erasures contained in the created record, and sets "in use" as the sheet state included in the same record.

Then, the processor 20 sends the media ID selected in step S202 to the management information attaching apparatus 3 via the NIC 23 (step S203).

In step S203, the media registration process comes to an end for one sheet P, and the processor 20 returns to step S201 to standby for receiving the next registration request command. The user can use the printing apparatus 4 to form any image on the sheet P where the QR code symbol X has been printed via the management information attaching process.

When the sheet P on which an image has been formed with the printing apparatus 4 is to be reused, the user sets the sheet P in the sheet stacker 58 of the erasing and reuse-determination apparatus 5, and, at the same time, the user operates the input device included in the user interface 52 of the erasing and reuse-determination apparatus 5 to give an instruction to start the erasing and reuse-determination process.

Figure 9:
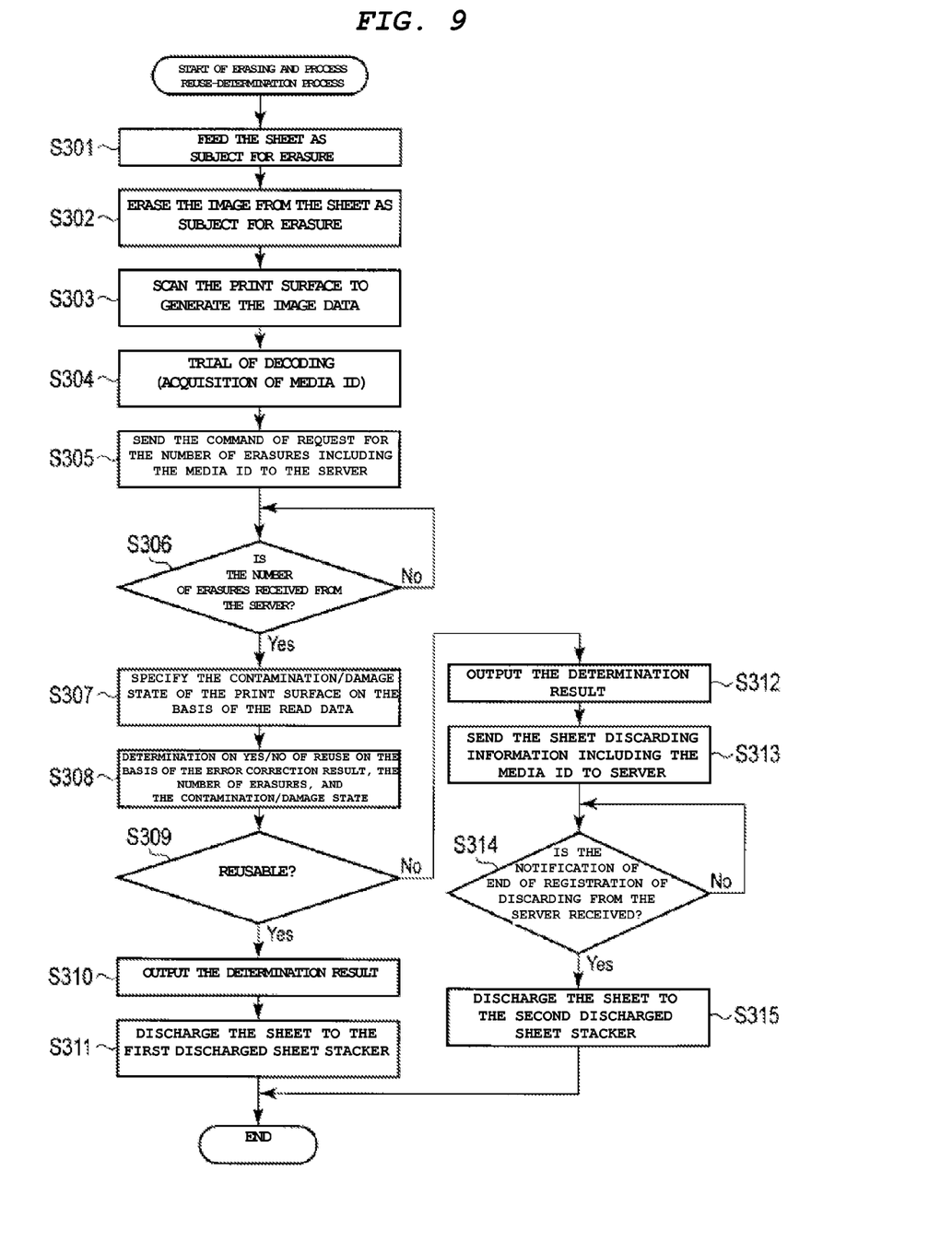
FIG. 9 is a flow chart illustrating the erasing and reuse-determination process according to the first embodiment.

In the erasing and reuse-determination process, the processor 50 of the erasing and reuse-determination apparatus 5 operates according to the flow chart shown in FIG. 9. Referring to FIGS. 3 and 9, the processor 50 controls the feeding mechanism 54 to convey the sheet P in the sheet stacker 58 to the image erasing position (step S301). Then, the processor 50 controls the erasure mechanism 55 to erase the image from the print surface of the sheet P (step S302). After the erasure operation, the processor 50 controls the scanner 56 to read the print surface of the sheet P to generate the image data, which are then stored in the memory 51 (step S303). The image data may be either a monochromic data or a multi-gradation data having 3 or more gradations.

After step S303, the processor 50 works as the decoding section 100, and it carries out a trial for decoding of the management information represented by the QR code symbol X (object) printed on the sheet P which has been erased (step S304). More specifically, in step S303, the processor 50 locates and reads the pattern of the QR code symbol X from the image data stored in the memory 51, and, on the basis of the position of the detected finder pattern, it generates the binary data representing the various cells that form the QR code symbol X. The binary data include the management information and the redundancy symbol in the Reed-Solomon code. The processor 50 uses the redundancy symbol included in the binary data to execute an error correction for the binary data (detection and correction of the unmatched sites). The processor 50 then stores the management information as the result of decoding and the number of corrections made for the unmatched sites in the error correction (hereinafter to be referred to as error correction frequency L) in the memory 51.

Then, the processor 50 sends the number of erasures request command including the media ID included in the management information stored in the memory 51 in step S304 via the NIC 53 to the server 2 (step S305), and it stands by for receiving a number of erasures value to be sent from the server 2 (step S306). Upon receiving of the number of erasures request command, the server 2 replies to the management information attaching apparatus 3 by sending the number of erasures value written in the record in the management DB 21*a* corresponding to the media ID contained in the same command in an operation as to be explained later with reference to FIG. 10.

Upon receiving a number, indicating the number of erasures the sheet has undergone, from server 2 by the NIC 53 (Yes in step S306), the processor 50 stores the number of erasures (taken as number of erasures M) in the memory 51. Then, on the basis of the image data generated in step S303 (step S307), the processor 50 undertakes the contamination/damage state 102 evaluation step and determines the contamination/damage state of the print surface of the sheet P that has the image erased in step S302. For example, when the image data are of black and white monochromic data, the processor 50 specifies the number of the black pixels included in the image data as the contamination/damage state of the print surface. Also, when the image data are the multi-gradation data of 3 or more gradations, the processor 50 specifies the number of the pixels with gradation over a preset threshold among the various pixels included in the image data as the contamination/damage state of the print surface. When the image number is counted, the pixels in the region corresponding to the QR code symbol X may be ignored. The processor 50 stores the pixel number (taken as the pixel number N) specified as the contamination/damage state in the memory 51.

After step S307, the reusability determination section 103 of the processor 50 determines whether the sheet P can be reused on the basis of the error number L as the error correction result saved in the memory 51 in step S304, the number of erasures M received from the server 2 and stored in the memory in step S306, and the pixel number N as the contamination/damage state stored in the memory 51 in step S307 (step S308). More specifically, the processor 50 compares the error correction number L with the threshold $L^{th}$ related to the error correction frequency written in a threshold file 51*a*, compares the number of erasures M with the threshold $M^{th}$ related to the number of erasures written in the threshold file 51*a*, and compares the pixel number N with the threshold $N^{th}$ related to the pixel number written in the threshold file 51*a*. For example, suppose the processor 50 determines that all of the relationships of $L<L^{th}$, $M<M^{th}$ and $N<N^{th}$ are met, it determines that the sheet P can be reused. On the other hand, when at least one of the relationships of $L<L^{th}$, $M<M^{th}$ and $N<N^{th}$ is not met; it determines that the sheet P cannot be reused.

When it is determined that the sheet can be reused in step S308 (Yes in step S309), the output section 104 the processor 50 outputs the result of determination that the sheet can be reused by the message display on the display unit, flashing of a lamp, or a voice output from the speaker included in the user interface 52 (step S310). This determination result may also be output via the NIC 53 to the server 2 and other equipments.

In addition, the discharging control section 105 directs the sheet P, after erasure of the image thereon, to the first discharged paper stacker 59*a* (step S311) for reuse. On the other hand, when it is determined that the sheet cannot be reused in step S308 (No in step S309), the output section 104 outputs the determination result that that sheet cannot be reused by the message display on the display unit, flashing of the lamp, or output of voice from the speaker included in the user interface 52 (step S312). The determination result may also be output via the NIC 53 to the server 2 and other equipments.

Then, the processor 50 sends the sheet discarding information including the media ID included in the management information stored in the memory 51 in step S304 via the NIC 53 to the server 2 (step S313), and it then stands by for receiving notification of the discarding of the registration of the sheet from the server 2 (step S314). As to be explained later with reference to FIG. 11, upon receiving of the sheet discarding information, the server 2 rewrites the registration information into the management DB 21*a* corresponding to the media ID, and then replies with notification that registration of the sheet to that registration number has ceased.

Upon receiving of the discarding registration end notification replied from the server 2 by the NIC 53 (Yes in step S314), the processor 50 works as the discharging control section 105, so that the sheet P after erasure of the image thereon is discharged to the second discharged paper stacker 59*b* (step S315).

With the operation carried out in step S311 or step S315, a series of erasing and reuse-determination processes come to an end. The user can recognize that the sheet P can be reused from the output in step S310 or the fact that the sheet P has been discharged to the first discharged paper stacker 59*a*, or the user can recognize that the sheet P cannot be reused from the output in step S312 or the fact that the sheet P has been discharged to the second discharged paper stacker 59*b*.

During the period when the reuse system 1 works, the server 2 executes the number of erasures count-up process alongside the other processes. In the number of erasures count-up process, the processor 20 of the server 2 works according to the flow chart shown in FIG. 10. That is, the processor 20 stands by for receiving of the number of erasures request command to be sent from the erasing and reuse-determination apparatus 5 in step S305 (step S401).

Figure 10:
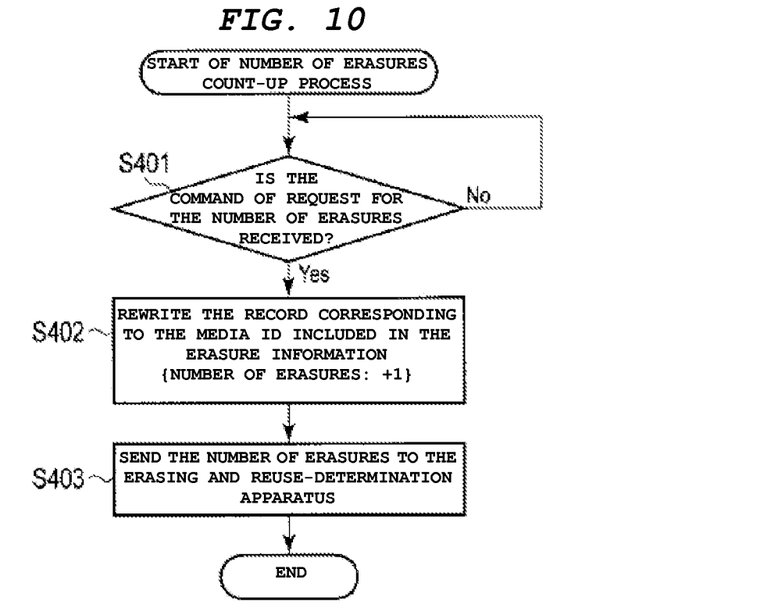
FIG. 10 is a flow chart illustrating the number of erasures count-up process according to the first embodiment.

Upon receiving the number of erasures request command via the NIC 23 (Yes in step S401), the processor 20 searches for the record corresponding to the media ID contained in the same command from the management DB 21*a*, and rewrites the number of erasures included in the found record by the value incremented by 1 (step S402).

Then, the processor 20 sends the number of erasures after rewrite in step S402 to the erasing and reuse-determination apparatus 5 via the NIC 23 (step S403).

In step S403, the number of erasures count-up process with respect to one number of erasures request command comes to an end, and the processor 20 returns to step S401, and stands by for receiving of the next number of erasures request command.

During the period when the reuse system 1 in operation, the server 2 executes the discarding process alongside other processes. In the discarding process, the processor 20 of the server 2 works according to the flow chart shown in FIG. 11. That is, the processor 20 stands by for receiving of the sheet discarding information to be sent from the erasing and reuse-determination apparatus 5 in step S313 (step S501).

Figure 11:
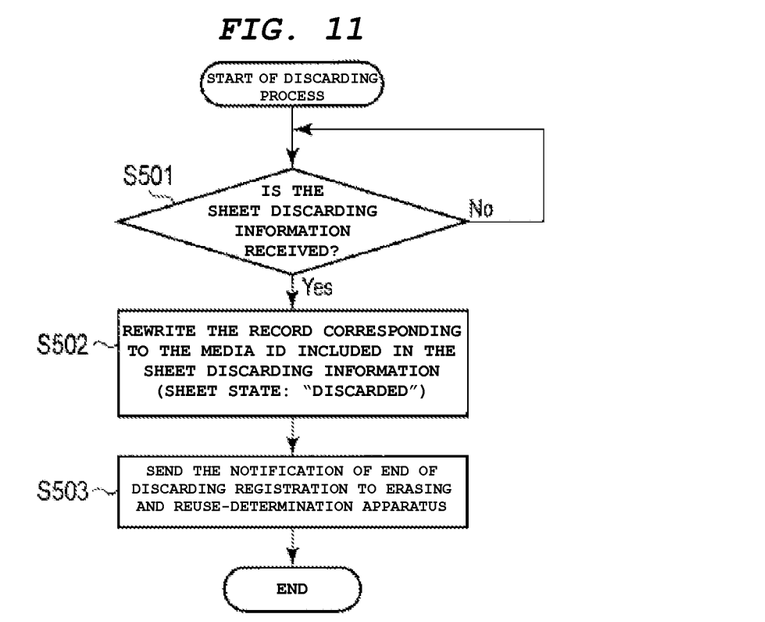
FIG. 11 is a flow chart illustrating the discarding process according to the first embodiment.

Upon receiving the sheet discarding information via the NIC 23 (Yes in step S501), the processor 20 searches for the record corresponding to the media ID contained in the same information from the management DB 21a, and rewrites the sheet state included in the found record to the "discarded" (step S502).

Then, the processor 20 sends the discarding registration end notification to the erasing and reuse-determination apparatus 5 via the NIC 23 (step S503).

With the step S503, the discarding process for one piece of the sheet discarding information comes to an end, and the processor 20 then returns to step S501, and it stands by for receiving of the next sheet discarding information.

In this way, as the server 2 carries out the number of erasures count-up process and the discarding process, the various records included in the management DB 21a can be instantly refreshed to the contents that can reflect the actual number of erasures and the sheet state of the sheet P.

As explained above, in the reuse system according to the present embodiment, the sheet P is managed by attaching the QR code symbol X on the sheet P. Then, on the basis of the result of the error correction carried out when the QR code symbol X is decoded, the erasing and reuse-determination apparatus 5 determines whether or not the sheet P can be reused. Usually, when the print surface of the sheet P where the QR code symbol X has been printed degrades, the QR code symbol X printed on the print surface is also scratched or damaged, and the error correction frequency increases. In consideration of this feature, determination is made on whether the sheet P can be reused on the basis of the result of the error correction carried out in decoding of the data recorded on the QR code symbol X as in this embodiment, so that it is possible to prevent reuse of a sheet P that has been seriously degraded. In addition, it is possible to discard the sheet P while error correction can be carried out, that is, before the QR code symbol X becomes impossible to be read.

Also, the erasing and reuse-determination apparatus 5 determines whether the sheet P can be reused on the basis of the contamination/damage state of the print surface specified from the image data obtained by reading the print surface after erasure of the image in addition to the result of the error correction. In this way, as the contamination/damage state of the print surface is added to the factors for determination, when the print surface is contaminated by traces of a stapler or residual image, or the like, it is also possible to prevent reuse of the sheet P.

In addition, the erasing and reuse-determination apparatus 5 can determine whether the sheet P can be reused on the basis of the number of erasures of images from the print surface of the sheet P in addition to the result of the error correction. When the number of previous erasures of the sheet is added to the factors used for determination of whether to reuse the sheet, it is possible to prevent reuse of the sheet P with the print surface degraded due to damage caused in the image erasure process.

In addition, there are various other preferable effects for the configuration disclosed in the present embodiment.

(Second Embodiment)

In the following, the second embodiment will be explained.

This embodiment differs from the first embodiment in that instead of the QR code symbol, a magnetic stripe (magnetic element) is used as the object for recording the management information. Otherwise, the same reference numerals as those in the first embodiment will be adopted, and the duplicated explanation will be given again, only if necessary.

Figure 12:
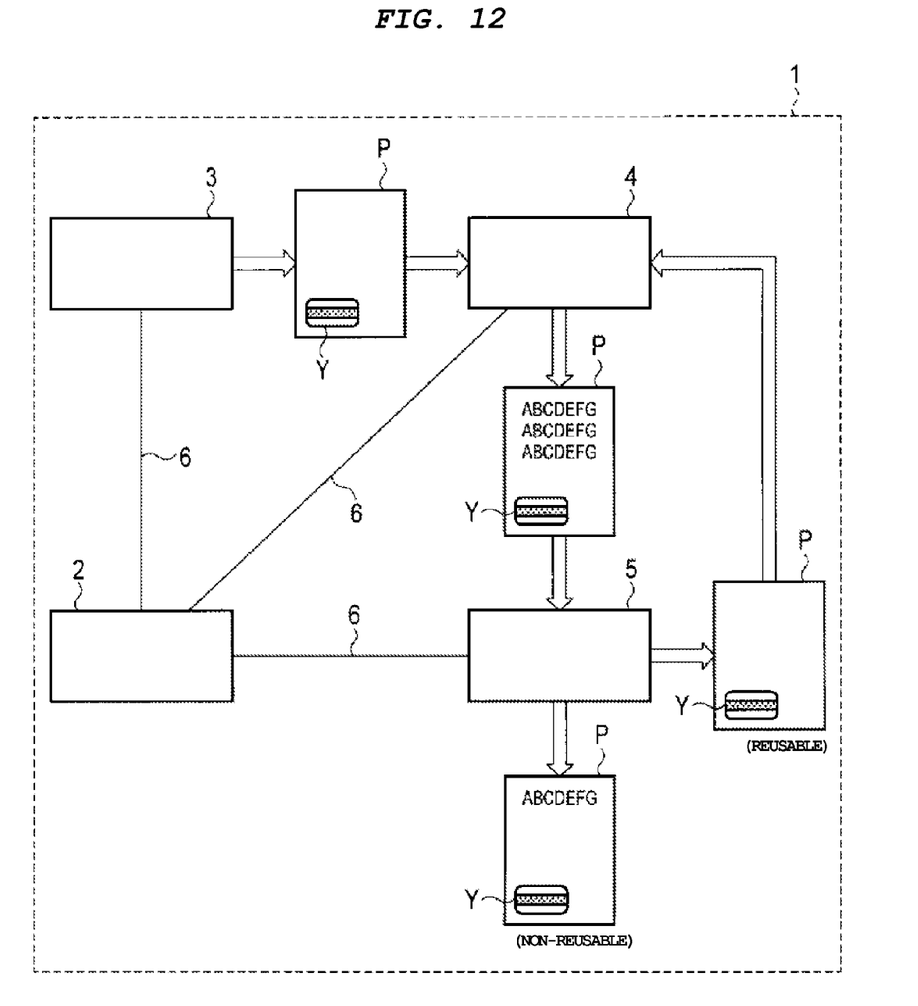
FIG. 12 is a block diagram illustrating the configuration of the reuse system according to a second embodiment.

FIG. 12 is a block diagram illustrating the configuration of the reuse system 1 according to this embodiment. Here, just as in the first embodiment, the reuse system 1 has a server 2, a management information attaching apparatus 3, a printing apparatus 4, and a erasing and reuse-determination apparatus 5. However, in this embodiment, instead of the QR code symbol, the management information attaching apparatus 3 attaches a magnetic stripe Y that has the management information for the sheet P recorded thereon. For example, the magnetic stripe Y may be formed on a label having an adhesive layer on one surface. This label is then attached on the sheet P via the adhesive layer.

Figure 13:
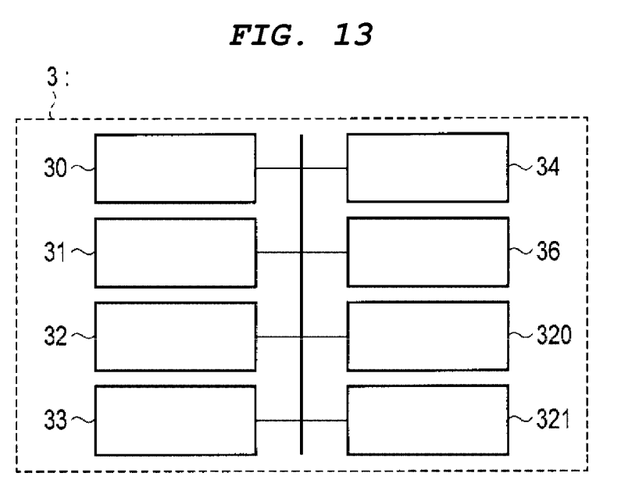
FIG. 13 is a block diagram illustrating the configuration of the main portion of the management information attaching apparatus according to the second embodiment.

FIG. 13 is a block diagram illustrating the configuration of the components of the main portion of the management information attaching apparatus 3 according to the present embodiment. Here, the management information attaching apparatus 3 includes a magnetic stripe R/W (Reader/Writer) 320 and a magnetic stripe attaching mechanism 321 instead of the printing mechanism 35 adopted in the first embodiment.

For example, the magnetic stripe R/W 320 carries out per-writing of tracking information, such as an identification number or letter code, on the magnetic stripe Y of the label before it is affixed to the sheet P. This can be performed on a mount (not shown), and it the information is there read from the magnetic stripe Y. Then, the magnetic stripe attaching mechanism 321 peels the label from the mount and bonds it on the sheet P within the feeding mechanism 34.

Figure 14:
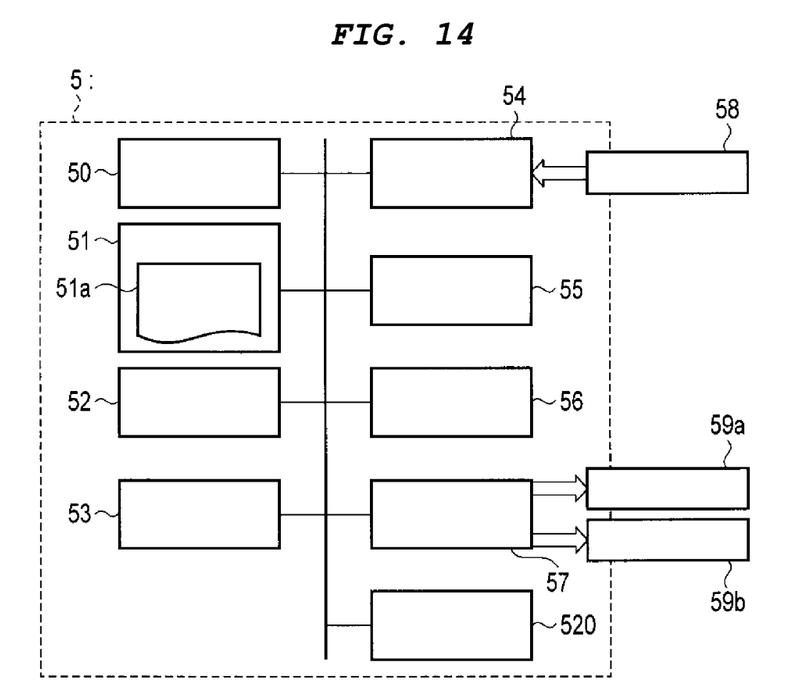
FIG. 14 is a block diagram illustrating the configuration of the main portion of the erasing and reuse-determination apparatus according to the second embodiment.

FIG. 14 is a block diagram illustrating the configuration of the main portion of the erasing and reuse-determination apparatus 5 according to the present embodiment. Here, in addition to the composing requirements explained above for the first embodiment, the erasing and reuse-determination apparatus 5 also includes a magnetic stripe R/W unit 520. In the present embodiment, the magnetic stripe R/W unit 520 works as a reading device.

The magnetic stripe R/W unit 520 carries out writing of the information on the magnetic stripe Y attached on the sheet P fed by the feeding mechanism 54 and reading of the information from the same magnetic stripe Y.

The management code attaching process carried out by the management information attaching apparatus 3 is basically the same as that of the flow explained with reference to the flow chart shown in FIG. 7 in the first embodiment. However, in step S103, the processor 30 converts the management information including the media ID received from the server 2 to the Reed-Solomon code to generate the redundancy symbol, and it controls the magnetic stripe R/W 320 to write the management information and the redundancy symbol on the magnetic stripe Y of the label on the mount. Then, the processor 30 controls the feeding mechanism 34 to convey the sheet P in the sheet cassette to the label bonding position with the magnetic stripe attaching mechanism 321 while it controls the magnetic stripe attaching mechanism 321 to bond the label to a sheet P after writing of the management information on the magnetic stripe Y on the corresponding sheet P. Then, the processor 30 controls the discharge mechanism 36 to discharge the corresponding sheet P to the discharged sheet tray.

The reusability determination process carried out by the erasing and reuse-determination apparatus 5 is basically the same as that of the flow explained with reference to the flow chart shown in FIG. 9 for the first embodiment. However, in the present embodiment, in step S103, the processor 50 works as the decoding section 100, and carries out trial of the decoding for the management information recorded on the magnetic stripe Y of the label bonded on the sheet P as the erasure subject. More specifically, the processor 50 controls the magnetic stripe R/W unit 520 to make a magnetic scan of the magnetic stripe Y to obtain the binary data recorded on the magnetic stripe Y. The binary data includes the management information and the redundancy symbol in the Reed-Solomon code. The processor 50 uses the redundancy symbol included in the binary data to carry out error correction (detection and correction of the unmatched sites) for the binary data. The processor 50 then stores the management information as the result of decoding and the number of correction of the unmatched sites in the error correction operation (taken as the error correction count L) in the memory 51.

Then, in step S308, the processor 50 works as the reusability determination section 103, and it determines whether the sheet P can be reused according to the error correction count L or the like stored in the memory 51.

In the case of management of the sheet P with the magnetic stripe Y as in the present embodiment, when the sheet P is used in a poor environment, together with degradation of the print surface, the magnetic stripe Y also degrades or a portion of the data recorded on the magnetic stripe Y disappears, so that the number of error corrections in decoding increases. In consideration of this feature, by determining whether the sheet P can be reused on the basis of the result of the error correction carried out in decoding of the data recorded on the magnetic stripe Y as in the present embodiment, it is possible to prevent reuse of the sheet P with serious degradation, just as in the first embodiment. In addition, it is possible to discard the sheet P while error correction can be carried out, in other words, before the magnetic stripe Y becomes unable to be read.

In addition, with the configuration of the present embodiment, the same effects as those in the first embodiment also can be realized.

(Third Embodiment)

In the following, the third embodiment will be explained.

This embodiment differs from the first embodiment in that as the object for recording the management information, an RFID (Radio Frequency Identification) tag is used. Otherwise, the same reference numerals as those used in the first and second embodiments are adopted, and duplicated explanation will be given only if necessary.

Figure 15:
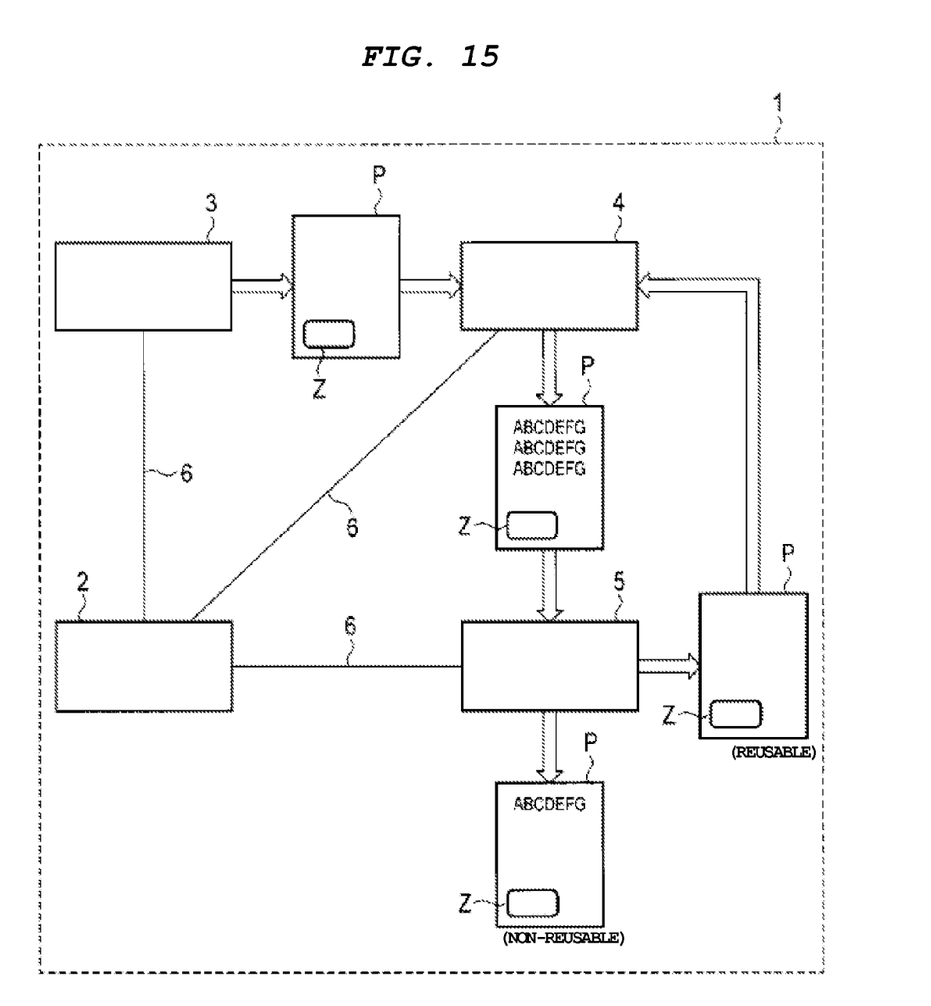
FIG. 15 is a block diagram illustrating the configuration of the reuse system according to a third embodiment.

FIG. 15 is a block diagram illustrating the configuration of the reuse system 1 according to the present embodiment. Here, just as in the first embodiment, the reuse system 1 has a server 2, a management information attaching apparatus 3, a printing apparatus 4, and an erasing and reuse-determination apparatus 5. However, in this embodiment, instead of the QR code symbol or the magnetic stripe, the management information attaching apparatus 3 attaches a RFID tag Z that has the management information recorded therein on the sheet P. For example, the RFID tag Z may have an inlet having an IC and an antenna on a base material with an adhesive layer formed on one surface. It is then attached on the sheet P via the adhesive layer.

Figure 16:
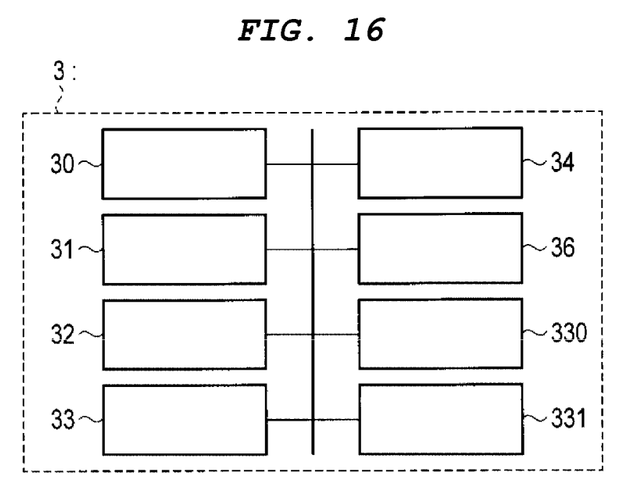
FIG. 16 is a block diagram illustrating the configuration of the main portion of the management information attaching apparatus according to the third embodiment.

FIG. 16 is a block diagram illustrating the configuration of the main portion of the management information attaching apparatus 3 according to the present embodiment. Here, the management information attaching apparatus 3 includes an RFID tag R/W unit 330 and an RFID tag attaching mechanism 331 instead of the printing mechanism 35 used in the first embodiment.

For example, the RFID tag R/W unit 330 carries out write of the information on the RFID tag Z of the label previously set in the management information attaching apparatus 3, while the RFID tag is on a mount, and it carries out read of the information from the same RFID tag Z. Then, the RFID tag attaching mechanism 331 peels the RFID tag Z from the mount and bonds it on the sheet P using the feeding mechanism 34.

Figure 17:
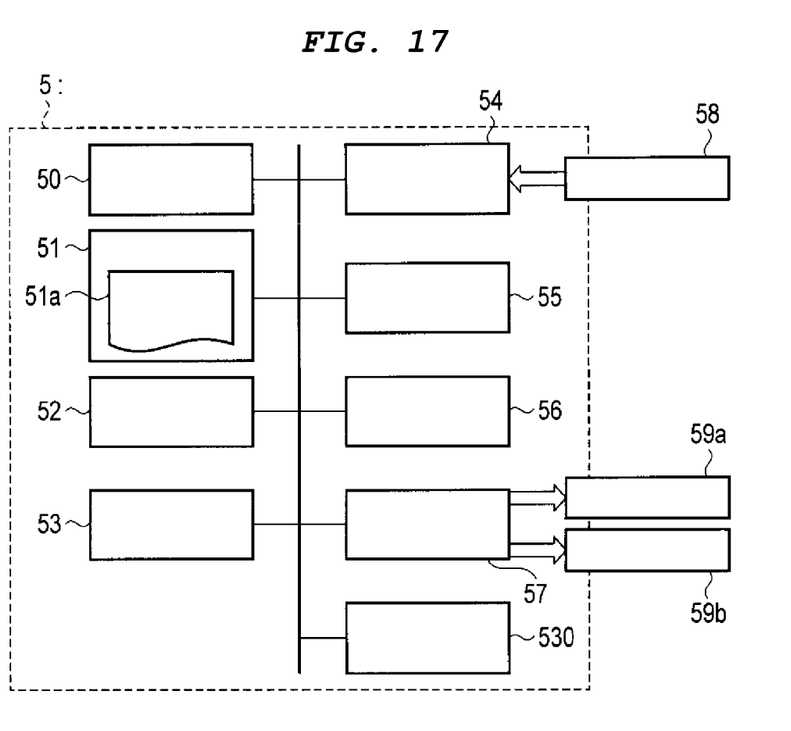
FIG. 17 is a block diagram illustrating the configuration of the main portion of the erasing and reuse-determination apparatus according to the third embodiment.

FIG. 17 is a block diagram illustrating the configuration of the main portion of the erasing and reuse-determination apparatus 5 according to the present embodiment. Here, in addition to the composing requirements explained above for the first embodiment, the erasing and reuse-determination apparatus 5 also includes a RFID tag R/W unit 530. In the present embodiment, the RFID tag R/W unit 530 works as a reading device.

The RFID tag R/W unit 530 carries out write of the information on the RFID tag Z attached on the sheet P fed by the feeding mechanism 54 and read of the information from the same RFID tag Z.

The management code attaching process carried out by the management information attaching apparatus 3 is basically the same as that of the flow explained with reference to the flow chart shown in FIG. 7 in the first embodiment. However, in step S103, the processor 30 converts the management information including the media ID received from the server 2 to Reed-Solomon code to generate the redundancy symbol, and it controls the RFID tag R/W unit 330 to write the management information and the redundancy symbol on the RFID tag Z of the label on the mount. Then, the processor 30 controls the feeding mechanism 34 to convey the sheet P in the sheet cassette to the label bonding position of the RFID tag attaching mechanism 331 while it controls the RFID tag attaching mechanism 331 to bond the label, after writing of the management information on the RFID tag Z, on the sheet P. Then, the processor 30 controls the discharge mechanism 36 to discharge the corresponding sheet P to the discharged sheet tray.

The reusability determination process carried out by the erasing and reuse-determination apparatus 5 is basically the same as that of the flow explained with reference to the flow chart shown in FIG. 9 for the first embodiment. However, in the present embodiment, in step S103, the processor 50 works as the decoding section 100, and carries out the decoding of the management information recorded on the RFID tag Z of the label bonded on the sheet P. More specifically, the processor 50 controls the RFID tag R/W unit 530 to communicate at radio frequency with the RFID tag Z to obtain the binary data recorded on the RFID tag Z. The binary data includes the management information and the redundancy symbol in the Reed-Solomon code. The processor 50 uses the redundancy symbol included in the binary data to carry out error correction (detection and correction of the unmatched sites) for the binary data. The processor 50 then stores the management information as the result of decoding and the number of correction of the unmatched sites in the error correction operation (taken as the error correction number L) in the memory 51.

Then, in step S308, the processor 50 works as the reusability determination section 103, and it determines whether the sheet P can be reused according to the error correction number L or the like stored in the memory 51.

In the case of management of the sheet P with the RFID tag Z as in the present embodiment, when the sheet P is used in a poor environment, together with degradation of the print surface, the RFID tag Z also degrades or a portion of the data recorded on the RFID tag Z disappears, so that the number of error corrections in decoding increases. In consideration of this feature, by determining whether the sheet P can be reused on the basis of the result of the error correction carried out in decoding of the data recorded on the RFID tag Z as in the present embodiment, it is possible to prevent reuse of the sheet P with serious degradation, just as in the first embodiment and the second embodiment. In addition, it is possible to discard the sheet P while error correction can be carried out, in other words, before the RFID tag Z becomes unable to be read.

In addition, with the configuration of the present embodiment, the same effects as those in the first embodiment and the second embodiment also can be realized.

(Modified Examples)

The configurations disclosed in the first through third embodiments may be executed in various modified forms.

For example, for the management information attaching apparatus 3 in the first embodiment, one may also adopt a scheme in which instead of printing of the QR code symbol X on the sheet P, a label having the QR code symbol X printed thereon is bonded on the sheet P, and such label is simply issued without being bonded on the sheet P, for later attachment to a sheet. For the management information attaching apparatus 3 in the second and third embodiments, too, one may also adopt a scheme in which instead of bonding the label having the magnetic stripe Y thereon or the RFID tag Z on the sheet P, these labels or RFID tag Z may simply be issued for later attachment to a sheet.

In addition, when it is determined that the sheet cannot be reused in the case when a label having the QR code symbol X and attached on the sheet P is dirty, one may adopt a scheme in which a display unit, a lamp, or a speaker or the like included in the user interface 52 of the erasing and reuse-determination apparatus 5 is used to prompt the user to bond a new label.

In addition, in the configuration of the first embodiment, one may also adopt a scheme in which a code symbol other than the QR code symbol X, such a barcode, a VeriCode, a MaxiCode or the like, is adopted as the object for recording the management information.

In addition, one may also adopt a scheme in which the result of the error correction used to determine whether the sheet can be reused in the first through third embodiments is another numeral computed on the basis of the error correction number L. For example, as the result of the error correction adopted in determining of whether the sheet can be reused, the ratio Lr (=L/Lmax) of the error correction number L to the maximum value Lmax in error correction that can be executed in decoding may be adopted. In addition, just as the data converted to the Reed-Solomon code, when the data divided to plural blocks (also called symbols or words) are recorded on an object, and the error correction is carried out in the block units with respect to the data in decoding, as the result of the error correction adopted in determination of whether reuse can be made, the ratio of the number of the blocks succeeded in decoding to the number of the blocks that failed in decoding due to overrunning of the unmatched sites over the threshold allowed for the error correction may be used. In addition, the QR code symbol usually includes 3 finder patterns. If any of these finder patterns can be recognized, it is possible to determine the position of the rest finder patterns to perform trial of decoding of the data. When decoding of the QR code symbol X by such determination is a success, the number of the recognized finder patterns may be used to determine whether reuse can be made. Also, the QR code symbol X, the magnetic stripe Y and the RFID tag Z and other management information recorded on the object may also be encoded by an encoding system different from the Reed-Solomon code to enable error correction.

Also, the contamination/damage state used in determining on whether the sheet can be reused in the first through third embodiments may also be a numeral different from the pixel number N. For example, as the contamination/damage state adopted in determining whether the sheet can be reused, the ratio Nr (=N/Nmax) of the pixel number N to the total pixel number Nmax included in the image data generated in step S303 may also be used. In addition, as the contamination/damage state adopted in determination of whether the sheet can be reused, the area of the contamination/damage site determined on the basis of the pixel number N or the position of the contamination/damage site on the print surface of the sheet P may also be used.

One may also adopt the following scheme: in the first through third embodiments, even when it is determined that the sheet P can be reused in step S308, if the factor of determination, such as the error correction number L, the number of erasures M, or the pixel number N is higher than the preset threshold of $L^{th}$, $M^{th}$, or $N^{th}$, the erasing and reuse-determination apparatus 5 recommends the user to discard the sheet P by means of the display unit, the lamp, or the speaker included in the user interface 52.

In addition, one may also adopt the following scheme: in the first through third embodiments, the erasing and reuse-determination apparatus 5 also has a function that the value of each threshold written in the threshold file 51a can be changed by means of the input device included in the user interface 52.

In addition, one may also adopt the following scheme: in the first through third embodiments, the composing requirements of the server 2 and the management information attaching apparatus 3 and the processes executed by the server 2 and the management information attaching apparatus 3 are incorporated in the erasing and reuse-determination apparatus 5.

In addition, one may also adopt the following scheme: in the first through third embodiments, the computer programs stored in the memory 21 of the server 2, the memory 31 of the management information attaching apparatus 3 and the memory 51 of the erasing and reuse-determination apparatus 5 are written in the various memories in the manufacturing stage of the apparatus, or they may be later downloaded from the network into the various apparatus or they may be written in the various memories by reading from the CD-ROM and other recording media.

In addition, one may also adopt the following scheme: in the first through third embodiments, the functions of execution of the computer programs by the processor 20 of the server 2, the processor 30 of the management information attaching apparatus 3 and the processor 50 of the erasing and reuse-determination apparatus 5 may be realized by a hardware other than the processors 20, 30 and 50. For example, a portion or all of the decoding section 100, the number of erasures specifying section 101, the contamination/damage state specifying section 102, the reusability determination section 103, the output section 104, and the discharging control section 105 realized by executing the media reuse determination program by the processor 50 of the erasing and reuse-determination apparatus 5 may be arranged as a hardware other than the processor 50 in the erasing and reuse-determination apparatus 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A print media reuse determination apparatus for determining a suitability of reuse of a sheet of print media having a machine readable identifier thereon and an erased image thereon, comprising:
   a reading unit configured to read a machine readable identifier; and
   a processor configured to
   decode the machine readable identifier read by the reading unit,
   generate an error value corresponding to a number of error corrections made during decoding of the machine readable identifier,
   determine whether the print media can be reused, based on the error value, and
   output results of determination.

2. The print media reuse determination apparatus according to claim 1, wherein the processor is further configured to determine a state of the erased image, and determines whether the print media can be reused also based on a state of the erased image.

3. The print media reuse determination apparatus according to claim 2, wherein
   the processor determines that the print media can be reused when the error value is lower than a threshold, or that the print media cannot be reused when the error value is larger than the threshold.

4. The print media reuse determination apparatus according to claim 1, wherein
   the processor is further configured to receive a number of the times the print media has been subjected to an erasing process, and determines whether or not the print media can be reused also based on the number of times.

5. The print media reuse determination apparatus according to claim 1, wherein the machine readable identifier includes a code symbol, a magnetic member, or a wireless tag.

6. A non-transitory computer readable medium comprising a print media reuse determination program that is executable in a computer to cause the computer to carry out a method comprising the steps of:
   decoding an indicia carrying data related to management of the print media, the indicia being readable using a reading apparatus configured to read an object having information;
   generating, by a processor, an error value corresponding to a number of error corrections made during the decoding of the indicia;
   determining whether or not the print media can be reused based on the error value; and
   outputting result of determination.

7. The non-transitory computer readable medium according to claim 6, wherein the method further comprises:
   storing in a memory device a number of times the print media has been subjected to an erasing process, and wherein
   whether or not the print media can be reused is determined by the processor also based on the number of times.

8. The non-transitory computer readable medium according to claim 7, wherein the method further comprises:
   determining a state of an erased image on the print media, and wherein
   whether or not the print media can be reused is determined also based on the state of the erased image.

9. The non-transitory computer readable medium according to claim 8, wherein the determination of reuse is made by comparing the error value to an error value threshold, the number of times to an erasure number threshold, and the state of the erased image to an image quality threshold, and the print media is determined to be not reused if any of the thresholds are exceeded.

10. The non-transitory computer readable medium according to claim 9, wherein the method further comprises:
    controlling conveyance of the print media to a storage based upon the determination of the processor.

11. The non-transitory computer readable medium according to claim 9, wherein the image quality threshold is a predetermined pixel number.

* * * * *